(12) United States Patent
Murayama (10) Patent No.: US 8,854,933 B2
(45) Date of Patent: Oct. 7, 2014

(54) INFORMATION PROCESSING APPARATUS, DRIVE UNIT, DETECTION CIRCUIT AND CONTROL METHOD

(71) Applicant: Fujitsu Limited, Kawasaki (JP)

(72) Inventor: Masahiko Murayama, Fuchu (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/760,764

(22) Filed: Feb. 6, 2013

(65) Prior Publication Data

US 2013/0152111 A1 Jun. 13, 2013

Related U.S. Application Data

(63) Continuation of application No. PCT/JP2010/065000, filed on Sep. 2, 2010.

(51) Int. Cl.
| | |
|---|---|
| *G11B 21/08* | (2006.01) |
| *G11B 17/04* | (2006.01) |
| *G06F 1/26* | (2006.01) |
| *G11B 19/00* | (2006.01) |

(52) U.S. Cl.
CPC ............ *G11B 17/0401* (2013.01); *G11B 17/04* (2013.01); *G06F 1/26* (2013.01); *G11B 19/00* (2013.01)
USPC ...................................................... 369/30.27

(58) Field of Classification Search
USPC .............. 369/30.27, 53.42, 53.2, 53.1, 53.43, 369/47.44; 720/601; 713/320, 324, 330, 713/340
See application file for complete search history.

(56) References Cited

U.S. PATENT DOCUMENTS

| | | | |
|---|---|---|---|
| 7,636,924 B2 | 12/2009 | Ichinose et al. | |
| 7,733,745 B2* | 6/2010 | Langenhuizen | 369/30.17 |
| 7,817,503 B2* | 10/2010 | Ho | 369/30.27 |
| 7,929,383 B2* | 4/2011 | Yamazaki et al. | 369/30.27 |
| 7,990,811 B2* | 8/2011 | Ho | 369/30.27 |
| 8,385,164 B2* | 2/2013 | Yuan et al. | 369/30.27 |
| 2002/0172125 A1* | 11/2002 | Liao et al. | 369/30.27 |
| 2006/0200693 A1 | 9/2006 | Uehara | |
| 2008/0109833 A1* | 5/2008 | Hung | 369/30.27 |

(Continued)

FOREIGN PATENT DOCUMENTS

| | | |
|---|---|---|
| JP | 11-149689 | 6/1999 |
| JP | 2005-222679 | 8/2005 |

(Continued)

OTHER PUBLICATIONS

International Search Report, mailed in connection with PCT/JP2010/065000 and mailed Nov. 16, 2010.

(Continued)

*Primary Examiner* — Tan X Dinh
(74) *Attorney, Agent, or Firm* — Fujitsu Patent Center (57) ABSTRACT

An information processing apparatus includes a connector electrically connected to a drive unit in a state where the drive unit is connected to the information processing apparatus, a detector configured to detect an operation performed on a specific button disposed on the drive unit based on a change in a voltage of a specific pin of the connector in a state where the drive unit is connected to the information processing apparatus and an operational voltage is not applied to the drive unit and a power controller configured to start applying the operational voltage to the drive unit via the connector in response to the operation detected by the detector.

9 Claims, 9 Drawing Sheets

(56) References Cited

U.S. PATENT DOCUMENTS

| | | |
|---|---|---|
| 2008/0288801 A1 | 11/2008 | Takahashi |
| 2009/0199222 A1 | 8/2009 | Yamazaki et al. |
| 2011/0246138 A1* | 10/2011 | Chung et al. .................. 702/186 |
| 2012/0063283 A1* | 3/2012 | Chen .......................... 369/30.27 |

FOREIGN PATENT DOCUMENTS

| | | |
|---|---|---|
| JP | 2006-134371 A | 5/2006 |
| JP | 2006-244068 | 9/2006 |
| JP | 2007-157292 A | 6/2007 |
| JP | 2007-234202 | 9/2007 |
| JP | 2008-243326 A | 10/2008 |
| JP | 2009-187606 | 8/2009 |
| WO | WO-2007/066422 | 6/2007 |

OTHER PUBLICATIONS

Japanese Office Action mailed Nov. 12, 2013 for corresponding Japanese Application No. 2012-531623, with Partial English-language Translation.

* cited by examiner

INFORMATION PROCESSING APPARATUS, DRIVE UNIT, DETECTION CIRCUIT AND CONTROL METHOD

CROSS-REFERENCE TO RELATED APPLICATIONS

The present application is a U.S. continuation application filed under 35 USC 111(a) claiming benefit under 35 U.S.C. 120 and 365(c) of PCT International Application No. PCT/JP2010/065000 filed on Sep. 2, 2010, the entire contents of which are incorporated herein by reference.

FIELD

The disclosures discussed herein relate to an information processing apparatus, a drive unit, a detection circuit, and a control method.

BACKGROUND

Information processing apparatuses such as personal computers have optionally installed or are optionally connectable to a drive unit. An example of such a drive unit includes a so-called optical drive unit, into which a medium such as a compact disc (CD), a digital versatile disc (DVD), or a Blu-ray disc (Registered Trademark, BD) is loaded.

With recent improvement in the portability of information processing apparatuses, it is desirable to reduce power consumption of batteries that are incorporated in the information processing apparatuses. For example, when a medium is persistently not loaded in the drive unit, power communication between the information processing apparatus and the drive unit may be cut off, thereby terminating operational power supply to the drive unit.

Thereafter, when the drive unit is used again, the operational power may need to be supplied to the drive unit again to restart the power communication between the information processing apparatus and the drive unit. Such a technology to resupply the operational power is known in the art.

RELATED ART DOCUMENTS

Patent Document

Patent Document 1: Japanese Laid-Open Patent Publication No. 11-149689
Patent Document 2: Japanese Laid-open Patent Publication No. 2006-244068
Patent Document 3: Japanese Laid-open Patent Publication No. 2007-234202

SUMMARY

According to an aspect of an embodiment, there is provided an information processing apparatus that includes a connector electrically connected to a drive unit in a state where the drive unit is connected to the information processing apparatus, a detector configured to detect an operation performed on a specific button disposed on the drive unit based on a change in a voltage of a specific pin of the connector in a state where the drive unit is connected to the information processing apparatus and an operational voltage is not applied to the drive unit and a power controller configured to start applying the operational voltage to the drive unit via the connector in response to the operation detected by the detector.

The object and advantages of the invention will be realized and attained by means of the elements and combinations particularly pointed out in the appended claims.

It is to be understood that both the foregoing general description and the following detailed description are exemplary and explanatory and are not restrictive of the invention as claimed.

Other objects, features, and advantages of the present invention will become more apparent from the following detailed description when read in conjunction with the accompanying drawings.

DESCRIPTION OF EMBODIMENTS

To implement the technology to resupply the operational power, a specific mechanism may need to be disposed in both the information processing apparatus and the drive unit. The information processing apparatus having the above specific mechanism may fail to be compatible with an existing drive unit that is not provided with a corresponding mechanism compatible with the specific mechanism of the information processing apparatus. Likewise, the drive unit having the above specific mechanism may fail to be compatible with the existing information processing apparatus that is not provided with a corresponding mechanism compatible with the specific mechanism of the drive unit.

Thus, embodiments provide an information processing apparatus capable of resupplying operational power (i.e., an operational voltage) to a drive unit without adversely affecting compatibility with an existing drive unit, a drive unit to which operational power is resupplied without adversely affecting compatibility with an existing information processing apparatus, a detection circuit configured to detect depression of a specific button disposed on the drive unit, and a method of controlling the information processing apparatuses and the drive units.

In the following, the embodiment is described with reference to accompanying drawings. The embodiment may be applied to a laptop personal computer serving as a mobile information processing apparatus. Initially, external views of a personal computer (PC) according to the embodiment are described with reference to FIGS. 1 and 2.

Figure 1:
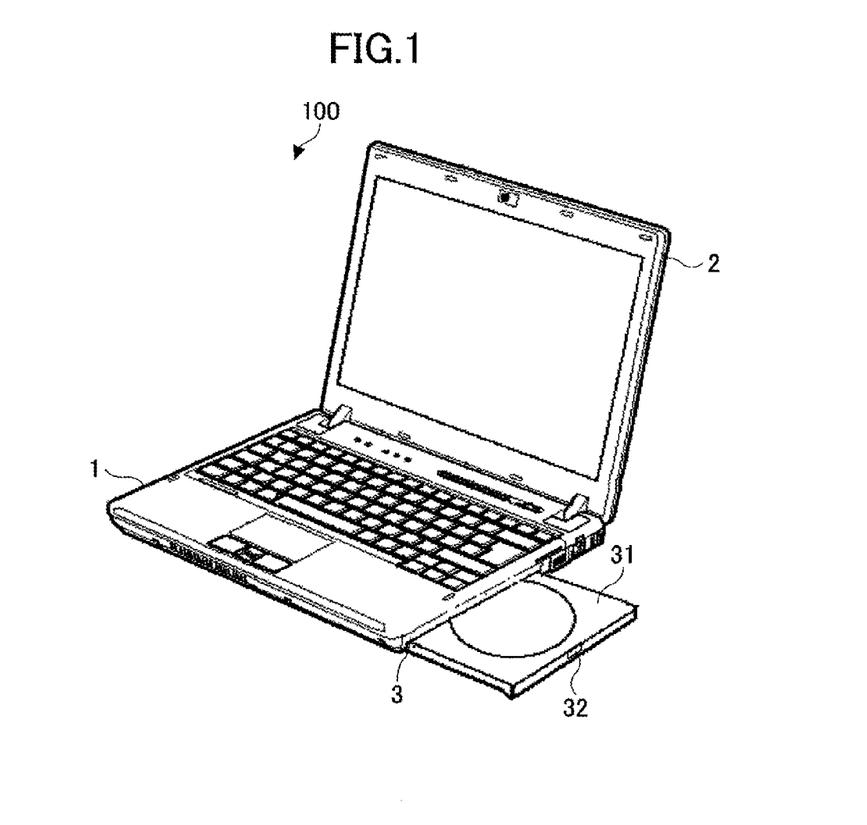
FIG. 1 is an external perspective view of a personal computer according to an embodiment illustrating a state in which a display unit is open and a tray of a drive unit is ejected.
Figure 2:
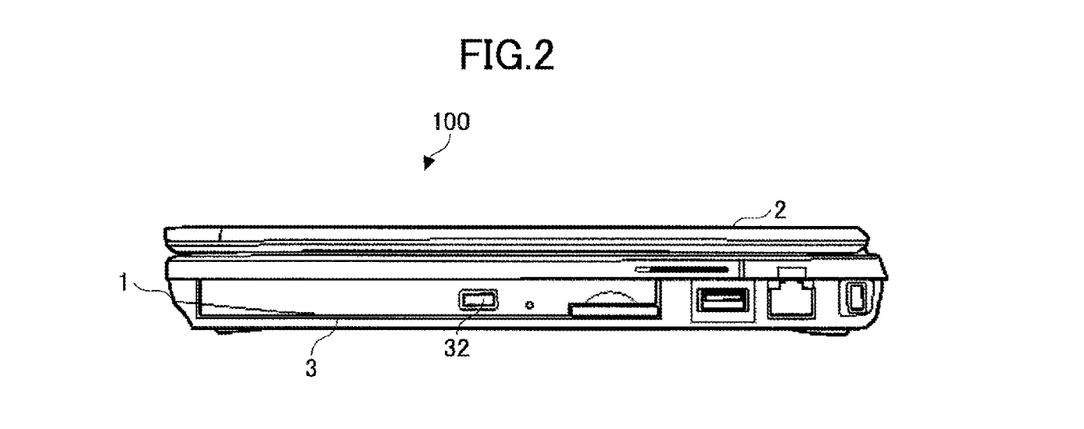
FIG. 2 is an external side view of the personal computer according to the embodiment illustrating a state in which the display unit is closed.

As illustrated in FIGS. 1 and 2, the PC 100 according to the embodiment includes a body 1 and a foldable display unit 2 pivotally connected to the body 1. A case of the body 1 incorporates an optical drive unit 3.

FIG. 1 illustrates the PC 100 in a state where the foldable display unit 2 is open and a tray 31 of the drive unit 3 is ejected from the body 1. The drive unit 3 includes an eject button 32. A user may press the eject button 32 to eject the tray 31.

When the user places a medium such as a compact disc (CD), a digital versatile disc (DVD), and a Blu-ray disc (BD) on the ejected tray 31, and presses the eject button 32 again or slightly pushes the tray 31 toward the tray 31 side, the medium disposed on the tray 31 is automatically loaded. That is, the eject button 32 is configured to receive an instruction from the user to load or eject the medium on the tray 31.

FIG. 2 illustrates a right-hand side of the PC 100. The drive unit 3 is configured to be fitted into the body 1 from the right-hand side of the PC 100. A front surface of the drive unit 3 is located on the right-hand side of the PC 100. Further, a universal serial bus (USB) connector for inserting a universal serial bus memory and a connector for connecting a local-area network (LAN) cable are disposed on the right-hand side of the PC 100.

Figure 3:
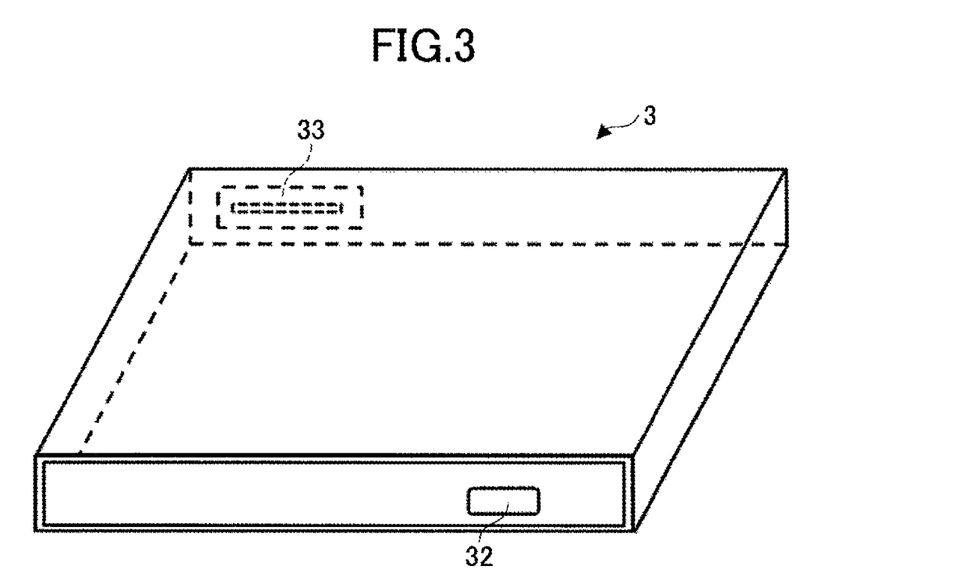
FIG. 3 is a view illustrating a drive unit installed in the personal computer according to the embodiment.

Next, a structure of the drive unit 3 is described with reference to FIG. 3. As illustrated earlier, the eject button 32 is disposed on the front surface of the drive unit 3. A rear surface of the drive unit 3 includes a connector 33 to establish electrical connection between various elements of the body 1 of the PC 100 and the drive unit 3. This connector 33 may be in compliance with standards such as the Serial Advanced Technology Attachment (i.e., the Serial ATA) interconnect standard.

Figure 4:
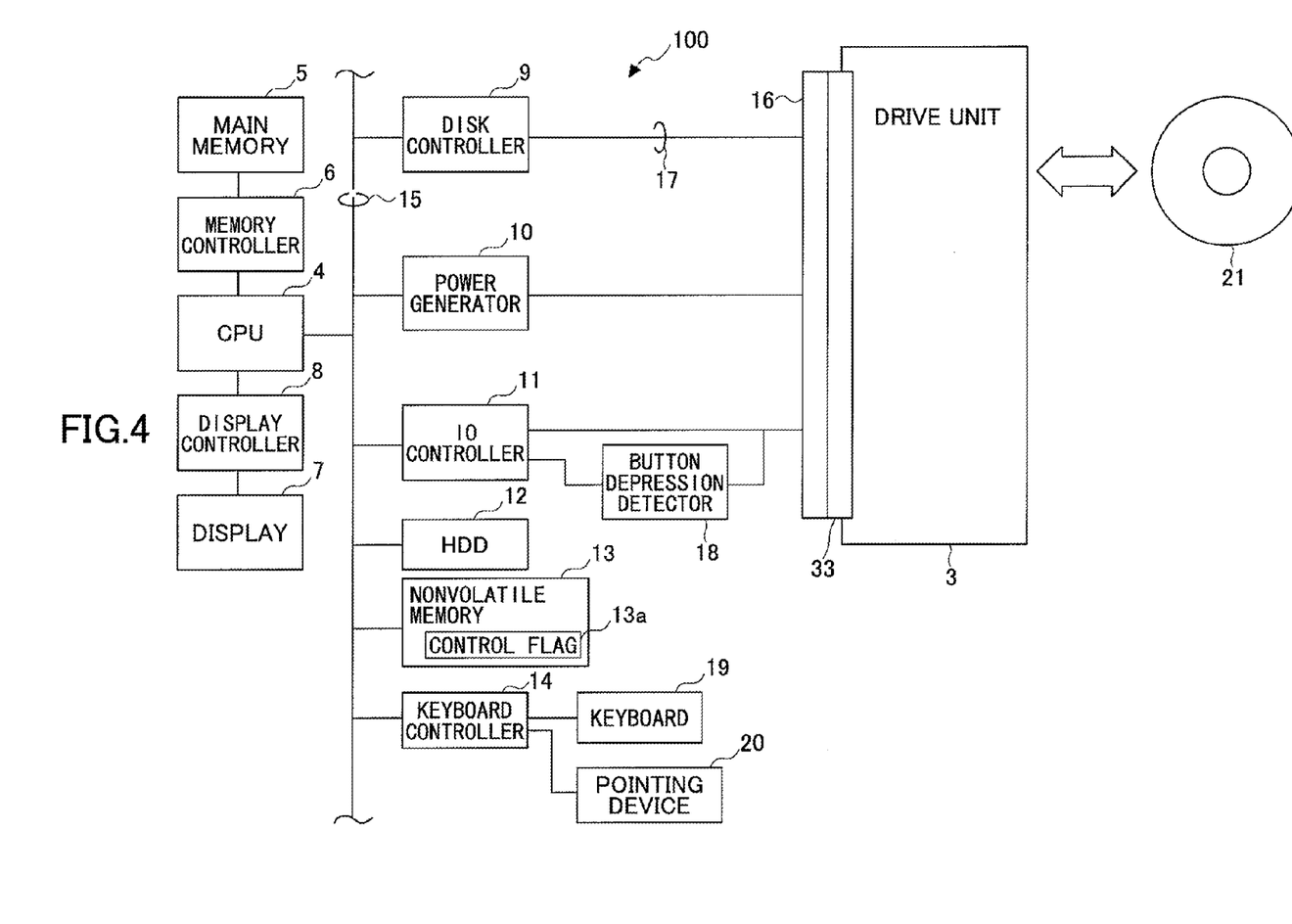
FIG. 4 is a block diagram illustrating a configuration of the personal computer according to the embodiment.

Next, a configuration of the PC 100 according to the embodiment is described with reference to FIG. 4.

The PC 100 includes a central processing unit (CPU) 4, a main memory 5, a memory controller 6, a display 7, and a display controller 8. The CPU 4 is connected to the main memory 5 via the memory controller 6. The CPU 4 is further connected to the display 7 via the display controller 8.

The CPU 4 handles overall control of the PC 100, and is configured to execute various programs deployed in the main memory 5 such as an operating system (OS), a basic input/output system (BIOS), and the like. The main memory 5 includes a volatile memory such as a random access memory (RAM). The main memory 5 may also serve as a working area for the programs to be executed by the CPU 4. The memory controller 6 is configured to control data communication including data transmission and data reception between the CPU 4 and the main memory 5.

The display 7 is formed of a display device such as a Liquid crystal display (LCD). The display controller 8 is configured to retain data for displaying on the display 7 under the control of the CPU 4. The display 7 is configured to display information according to the data retained by the display controller 8.

The CPU 4 is connected to a disk controller 9, a power generator 10, an input/output (IO) controller 11, a hard disk drive (HDD) 12, a nonvolatile memory 13, and a keyboard controller 14.

The disk controller 9 is connected to a connector 16 via a bus 17. The connector 16 is connected to the connector 33 of the drive unit 3. This connector 16 may be in compliance with standards such as the Serial ATA interconnect standard in a manner similar to the connector 33. The disk controller 9 is configured to control data communication including data transmission and data reception between the drive unit 3 and the disk controller 9 under the control of the CPU 4.

The power generator 10 is connected to the connector 16. The power generator 10 is configured to generate an operational voltage (power) for the drive unit 3 to apply the generated operational voltage to the drive unit 3 under the control of the CPU 4.

The I/O controller 11 is connected to the connector 16 and a button depression detector 18. The I/O controller 11 is configured to detect input and output devices and external storage devices that are optionally connected to the PC 100. The button depression detector 18 is configured to detect an operation (i.e., depression) of the eject button 32 of the drive unit 3 performed by the user in a state where the operational voltage is not applied to the drive unit 3 via the connector 16.

The hard disk drive (HDD) 12 includes a hard disk as a storage medium. The nonvolatile memory 13 includes an erasable programmable read-only memory (EPROM) or an electrically erasable and programmable read-only memory (EEPROM). The nonvolatile memory 13 is configured to retain the above-described BIOS. Further, the nonvolatile memory 13 is configured to retain a control flag 13a indicating whether to apply a control function of the embodiment. The control flag 13a may be set to be valid or invalid by the operation of the user at the startup of the PC 100.

A keyboard 19 and a pointing device 20 are connected to the keyboard controller 14. The keyboard controller 14 is configured to receive the user's operations of the keyboard 19 and the pointing device 20, and report the received operations to the CPU 4. The optical drive unit 3 may load a medium such as a CD, a DVD, or a BD.

Figure 5:
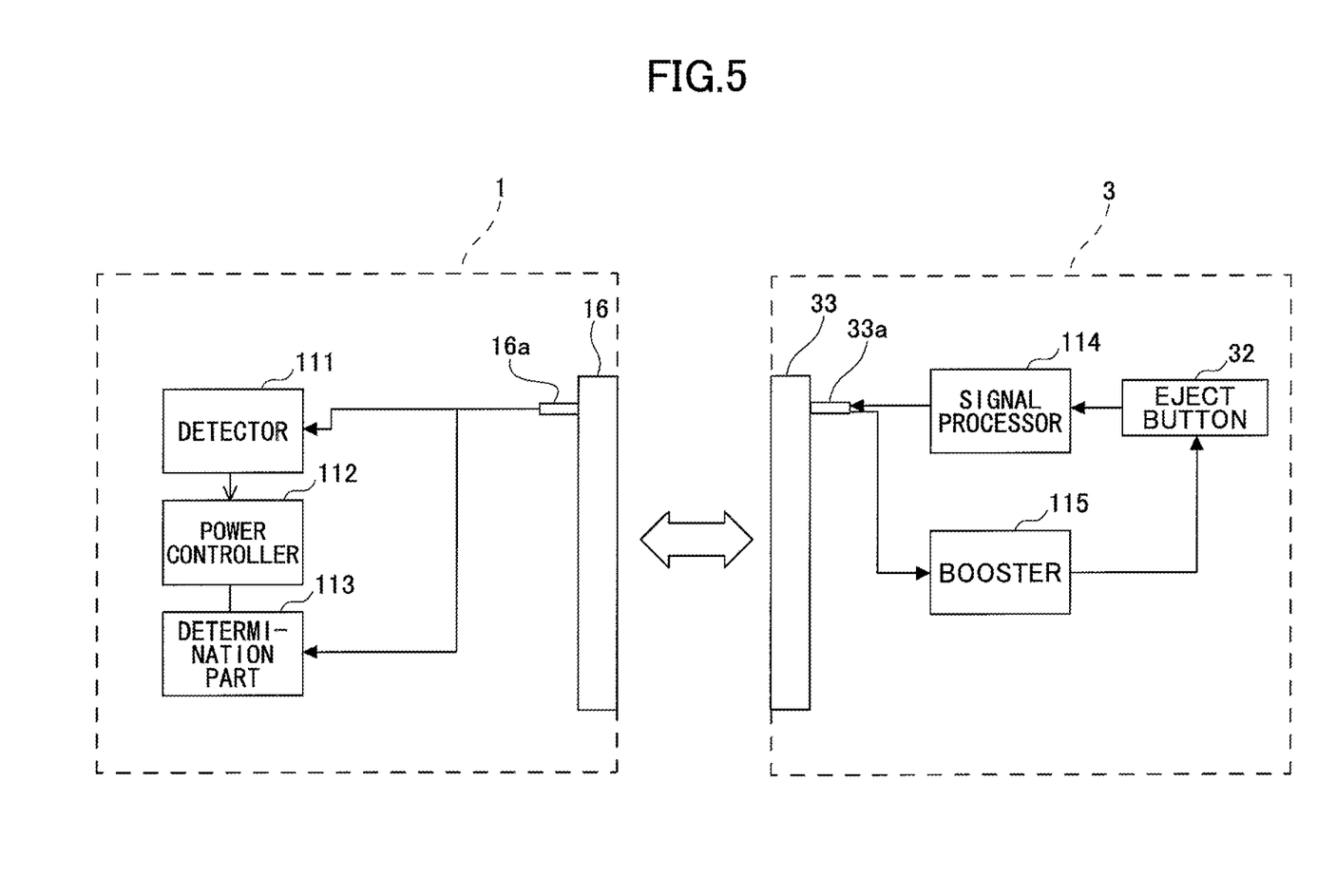
FIG. 5 is a diagram illustrating respective functions of the personal computer according to the embodiment and the drive unit installed in the personal computer.

Next, functions of the PC 100 according to the embodiment are described with reference to FIG. 5.

The functions of the body 1 include a detector 111, a power controller 112, and a determination part 113. The detector 111 is configured to detect an operation performed on the eject button 32 disposed on the drive unit 3 based on a change in a voltage of a specific pin 16a of the connector 16 in a state where the drive unit 3 is connected to the PC (the information processing apparatus) 100 and an operational voltage is not applied from the PC 100 (the body 1) to the drive unit 3. The power controller 112 is configured to start applying the operational voltage to the drive unit 3 via the connector 16 based on the operation detected by the detector 111.

The voltage of the specific pin 16a indicates any one of three different voltage values. The determination part 113 is configured to determine that the drive unit 3 is not connected to the PC 100 when the voltage of the specific pin 16a indicates a first voltage value, and that the drive unit 3 is connected to the PC 100 when the voltage of the specific pin 16a indicates a second voltage value less than the first voltage value.

The detector 111 is configured to detect an operation performed on the eject button 32 of the drive unit 3 to which the operational voltage is not applied when the voltage of the specific pin 16a is changed from the second voltage value to a third voltage value.

The function of the detector 111 may be implemented in collaboration with the CPU 4, and the I/O controller 11, or the button depression detector 18. The function of the power controller 112 may be implemented in collaboration with the CPU 4, and the I/O controller 11, or the button depression detector 18. The function of the determination part 113 may be implemented in collaboration with the CPU 4, or the I/O controller 11. The functions of the drive unit 3 include a signal processor 114, and a booster 115.

The signal processor 114 is configured to change a voltage of a specific pin 33a of the connector 33 in response to the operation of the eject button 32. The voltage of the specific pin 33a of the connector 33 indicates a voltage of a signal (i.e., device detecting signal) indicating that the drive unit 3 is connected to the body 1. Note that the device detecting signal is supplied from the body 1 to the specific pin 33a.

The booster 115 is configured to generate a signal (i.e., an eject button signal) by boosting the voltage of the specific pin 33a in a state where the drive unit 3 is connected to the PC 100 and the operational voltage is not applied from the PC 100 to the drive unit 33. The signal processor 114 is configured to lower the voltage of the eject button signal in response to the operation of the eject button 32 to merge the lowered voltage of the eject button signal into the voltage of the specific pin 33a.

The signal processor 114 is configured to change the voltage of the device detecting signal from the second voltage value to the third voltage value that is less than the second voltage value by merging the lowered voltage of the eject button signal into the voltage of the specific pin 33a. The signal processor 114 and the booster 115 may be implemented by utilizing various circuit elements.

Next, a circuit configuration peripheral to the connector 16 of the body 1 is described with reference to FIG. 6.

The power generator 10 is configured to supply drive power (Device Power) to pins P2 and P3 of the connector 16 in response to a power control signal (Device_Power_EN) sent from the CPU 4. A pin P1 (i.e., the specific pin 16a) of the connector 16 is supplied with a device detecting signal (Device_Present#) together with system logic power (System Logic Power).

Figure 6:
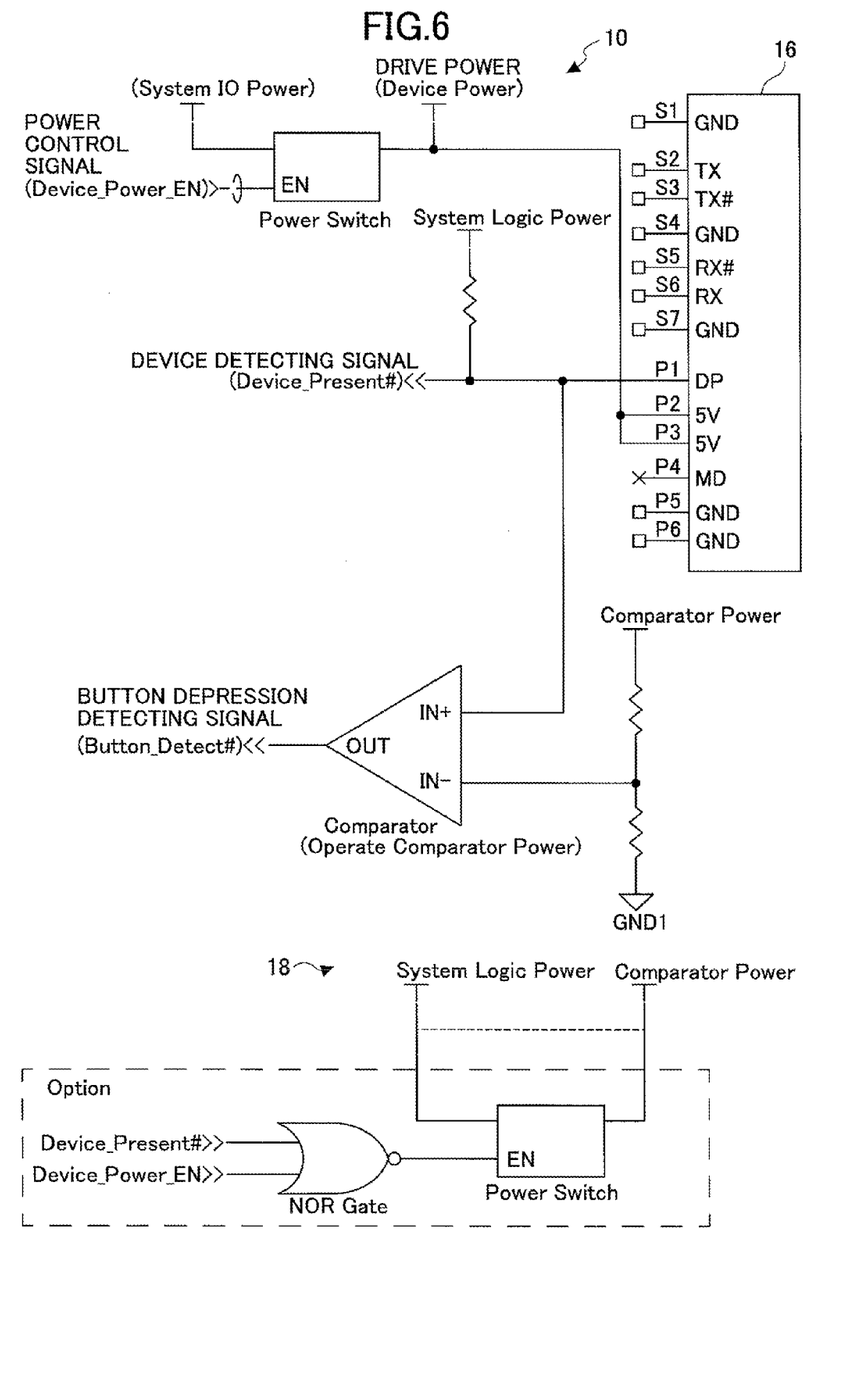
FIG. 6 is a diagram illustrating a configuration in the periphery of a connector connected to the drive unit in the personal computer according to the embodiment.

The button depression detector 18 includes, as illustrated in FIG. 6, a circuit element such as a comparator so that the device detecting signal and comparator power are input into the comparator, and a button depression detecting signal (Button_Detect#) is output from the comparator.

Figure 7:
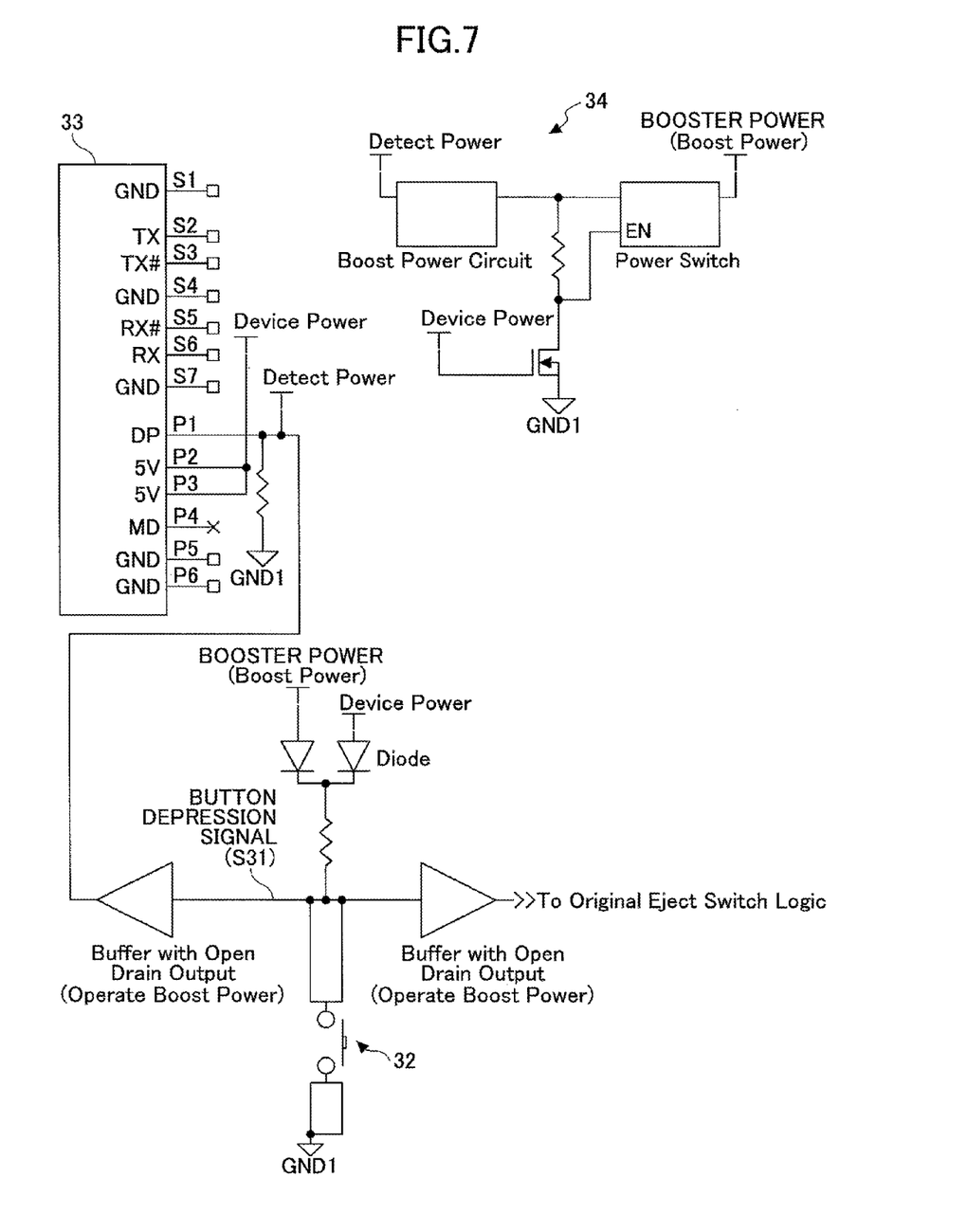
FIG. 7 is a diagram illustrating a configuration in the periphery of a connector of the drive unit installed in the personal computer according to the embodiment.

Next, a circuit configuration peripheral to the connector 33 is described with reference to FIG. 7.

A booster circuit 34 is configured to boost the voltage of the device detecting signal (Detect Power) of the pin P1 (i.e., the specific pin 33a) of the connector 33 to generate the boosted voltage (Boost Power). When the operational power is not supplied to the drive unit 3, a button depression detecting signal (S31) of the eject button 32 is generated in response to the depression operation. The button depression detecting signal is merged into the above-described device detecting signal.

Figure 8:
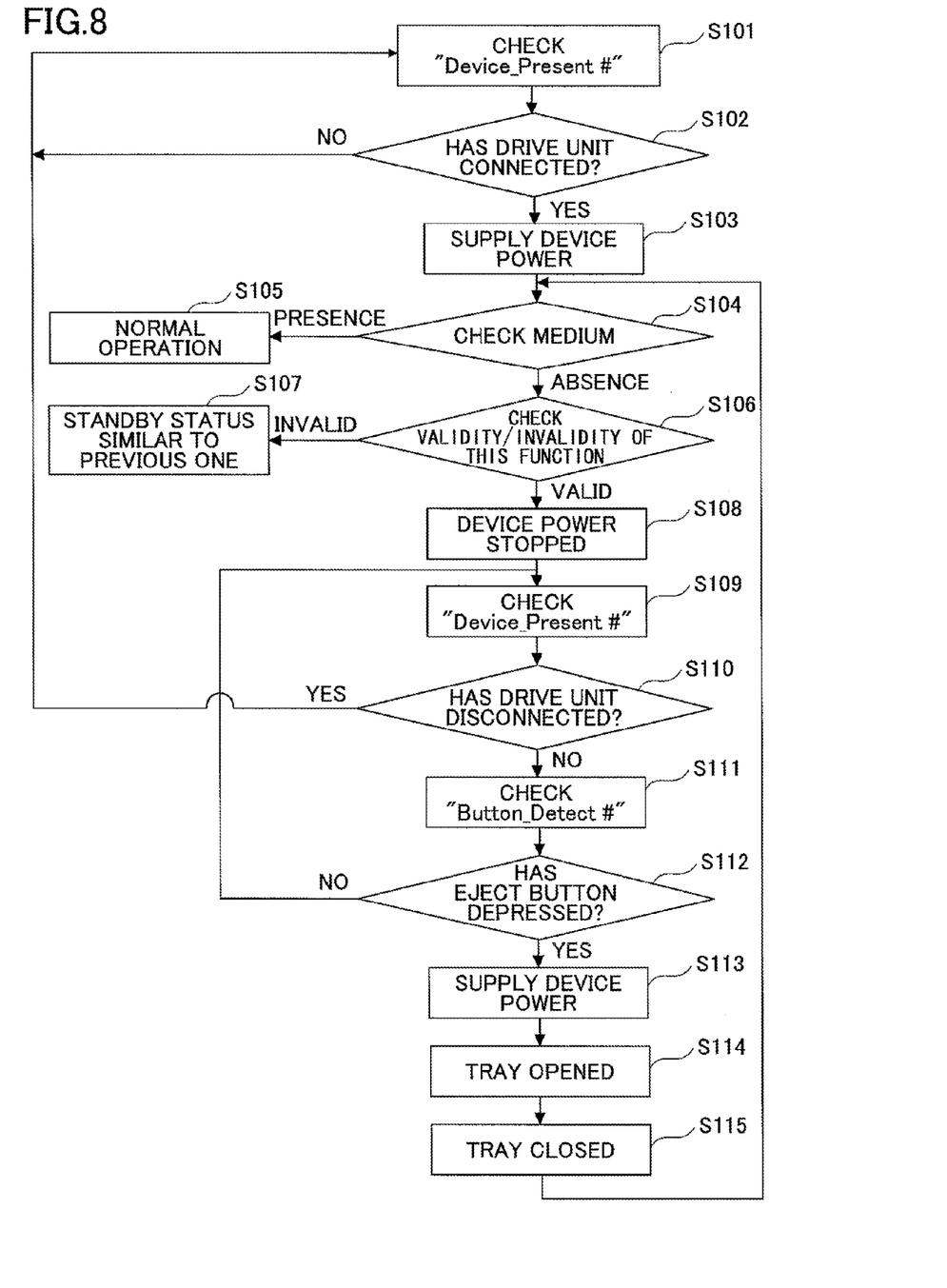
FIG. 8 is a flowchart illustrating an operation of the personal computer according to the embodiment.

Next, a control operation of the PC 100 according to the embodiment is described with reference to FIGS. 8 and 9. FIG. 8 is a flowchart illustrating the control operation.

The determination part 113 checks the voltage of the device detecting signal (Device_Present#) in response to startup of the PC 100 or a specific cycle (step S101). It is determined that the drive unit 3 is not connected to the body 1 of the PC 100 when the device detecting signal indicates a "high" level (i.e., the first voltage value) ("NO" in step S102). It is determined that the drive unit 3 is connected to the body 1 of the PC 100 when the device detecting signal indicates a "low" level (i.e., the second voltage value) ("YES" in step S102). The voltage value is an approximately 3 V when the device detecting signal indicates the high level (i.e., the first voltage value), whereas the voltage value is an approximately 0.3 V when the device detecting signal indicates the low level (i.e., the second voltage value).

When it is determined that the drive unit 3 is not connected to the body 1 of the PC 100 ("NO" in step S102), a process in step S101 is executed again. On the other hand, when it is determined that the drive unit 3 is connected to the body 1 of the PC 100 ("YES" in step S102), the drive power (Device Power), that is, the operational power is supplied to the drive unit 3 (step S103).

Figure 9:
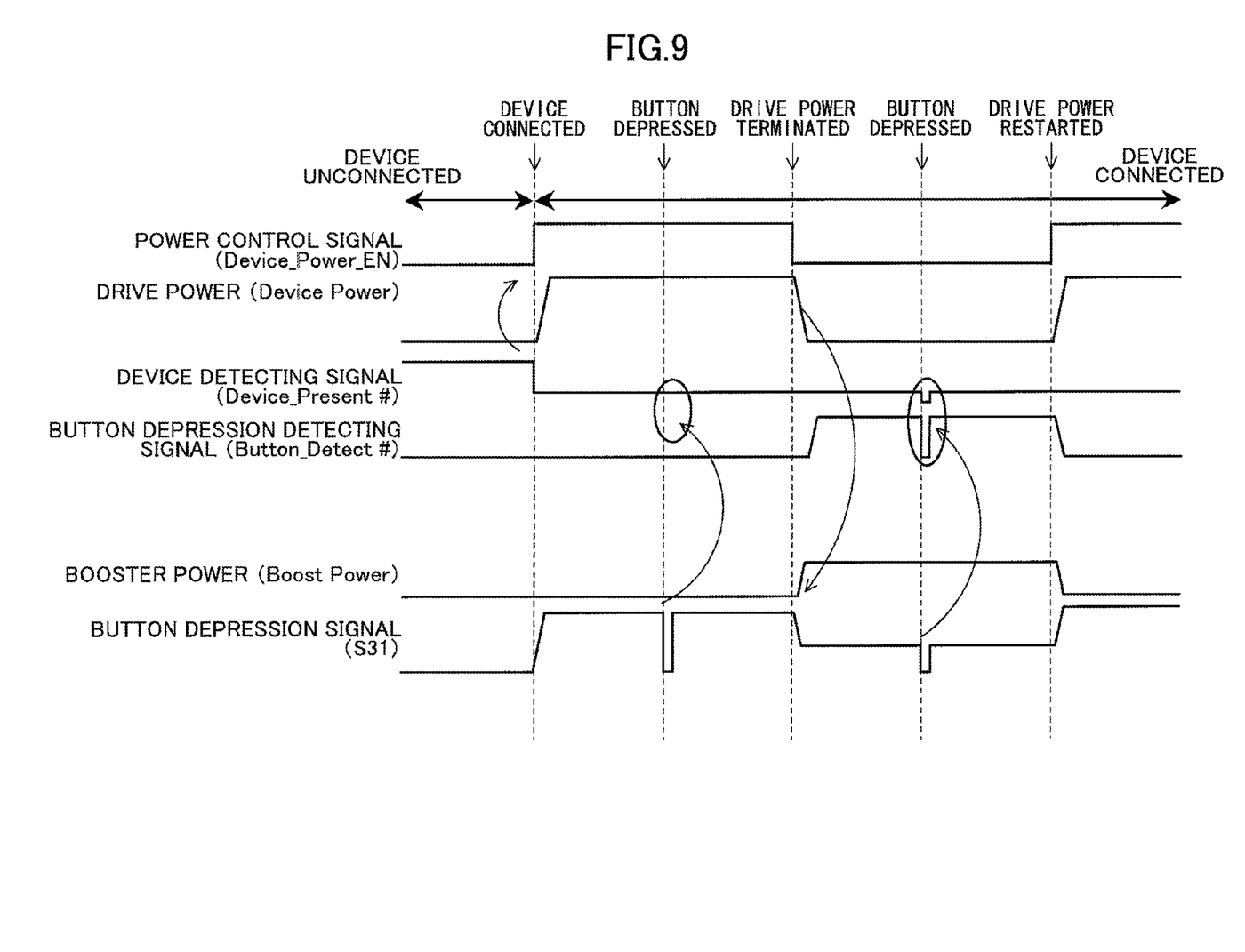
FIG. 9 is a timing chart of various signals in the personal computer according to the embodiment.

FIG. 9 is a timing chart illustrating various signals at the time of initiating power supply. When a "device unconnected" status is transitioned to a "device connected" status, the device detecting signal is changed from the high level to the low level. The drive power is supplied to the drive unit 3 when the power control signal is changed from a low level to a high level in response to the change in the device detecting signal from the high level to the low level.

A further description is given by referring back to the flowchart of FIG. 8. Having initiated the drive power supply, it is determined whether a medium is loaded in the drive unit 3 (step S104). When the medium is loaded in the drive unit 3 ("PRESENCE" in step S104), data transmission and reception are conducted between the body 1 of the PC 100 and the drive unit 3 in a manner similar to the related art case (step S105). The process in step S101 is regularly executed even in the above status.

Below, various signals generated by the depression of the eject button 32 in a normal operation are described with reference to FIG. 9. The button depression detecting signal is switched to a low level for a predetermined time length by depressing the eject button 32 of the drive unit 3 after the "device connected" status has been established. The tray 31 of the drive unit 3 is ejected from the body 1 in response to the depression of the eject button 32.

At this moment, since the booster 115 of the drive unit 3 is not operated, the device detecting signal indicating a low level remains unchanged. That is, the depression of the eject button 32 is not reported to the body 1 with the button depression detecting signal. In the normal operation, the depression of the eject button 32 is reported to the body 1 via the bus 17. Such a report is in compliance with a standard protocol.

A further description is given by referring back to the flowchart of FIG. 8. When the medium is not loaded ("ABSENCE" in step S104), whether the validity or invalidity of this function is checked (step S106). More specifically, it is determined whether the control flag 13a retained in the non-volatile memory 13 indicates validity or invalidity of the function. When the control flag 13a indicates invalidity ("INVALID" in step S106), the drive unit 3 is in a standby mode in a manner similar to the related art case (step S107).

The standby mode relies on the specification of the PC 100. For example, the drive power may continuously be supplied to the drive unit 3 when the drive unit 3 is in the standby mode. Alternatively, in the standby mode, the supply of the drive power is temporarily terminated, and a specific screen is displayed on the display 7 to allow the user to operate the keyboard 19 or the pointing device 20 to restart the supply of the drive power to the drive unit 3. The process in step S101 is regularly executed even in the above standby mode.

When the control flag 13a indicates validity ("VALID" in step S106), the supply of the drive power to the drive unit 3 is terminated after a predetermined time has elapsed (step S108). Various signals at this time are illustrated in FIG. 9. Initially, the power control signal is changed from a high level to a low level. The supply of the drive power may be terminated in response to the change in the power control signal. The booster 115 starts up in response to the termination of the drive power supply. Accordingly, the booster power is changed from a low level to a high level such that a circuit for generating a button depression signal is operable.

A further description is given by referring back to the flowchart of FIG. 8. After the termination of the operational voltage (i.e., the drive power) supply to the drive unit 3, the detector 111 determines the voltage value of the device detecting signal (step S109). When the voltage value of the device detecting signal indicates a high level, it is determined that the drive unit 3 is disconnected from the body 1 ("YES" in step S110). After a predetermined time has elapsed, the above-described process starting in step S101 is executed again.

When the voltage value of the device detecting signal indicates a low level, it is determined that the drive unit 3 is connected to the body 1 ("NO" in step S110). Thereafter, the voltage value of the button depression detecting signal (Button_Detect#) is determined (step S111). When the button depression detecting signal indicates a high level ("NO" in step S112), the process starting in step S109 is performed again.

When the button depression detecting signal indicates a low level ("YES" in step S112), the drive power is supplied again such that the tray 31 may be opened or closed (steps S113 to S115). Thereafter, the process starting in step S104 is performed again (back to step S104).

FIG. 9 illustrates various signals in a state where the eject button 32 is depressed and the drive power is not supplied to the drive unit 3. When the eject button 32 is depressed, the device detecting signal is changed from a low level (0.3 V) to a ground level (0 V). In response to the change in the device detecting signal, the button depression detecting signal is changed from a high level to a low level.

The detector 111 is configured to detect the operation of the eject button 32 that is performed in a state where the drive power is not supplied to the drive unit 3. The power controller 112 is configured to restart the application of the operational voltage to the drive unit, that is, to restart the supply of the drive power to the drive unit 3. The booster circuit 34 becomes a non-operational state again according to the restart of the supply of the drive power to the drive unit 3.

According to the above-described processes, in a unit such as the optical drive unit 3 incapable of physically detecting the medium when the electric power is not supplied to the optical drive unit 3, the operational voltage is reapplied to the drive unit 3 by the depression of the eject button 32 (a medium discharge button) to restart electric conductivity between the drive unit 3 and the body 1 of the PC 100.

Note that in steps S102 and S110, it is determined whether the voltage of the device detecting signal (Device_Present#) indicates a high level (i.e., 3 V) or a low level (i.e., 0.3 V). In the above determination, whether the voltage of the device detecting signal indicates a high level or a low level may be specified by setting, for example, 1.5 V as a threshold to determine whether the voltage value of the device detecting signal is greater than or equal to the set threshold, or less than the set threshold.

In step S112, it is determined whether the voltage of the button depression detecting signal (Button_Detect#) indicates a high level or a low level. Similarly, in this case, whether the voltage of the button depression detecting signal indicates a high level or a low level may be specified by setting a threshold in advance to determine whether the voltage value of the button depression detecting signal is greater than or equal to the set threshold, or less than the set threshold.

In this embodiment, no special mechanism having a special physical shape need be disposed in both the body 1 and the drive unit 3. The body 1 may be able to resupply the operational power (the operational voltage) without adversely affecting compatibility with the existing drive unit. Further, the drive unit 3 may be resupplied with the operational power without adversely affecting compatibility with the existing information processing apparatus.

Figure 10:
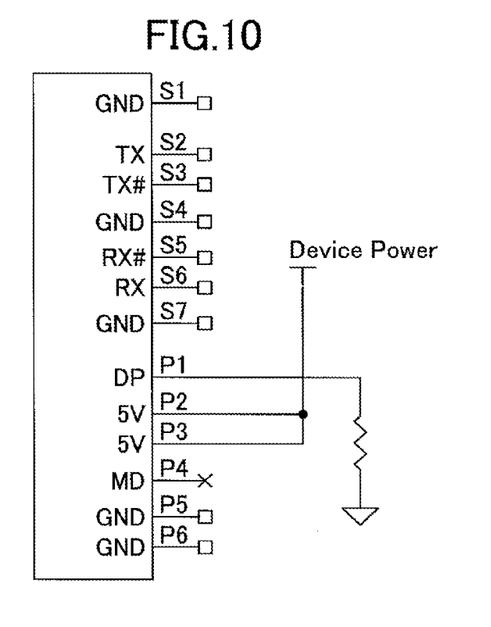
FIG. 10 is a diagram illustrating a configuration in the periphery of a connector of a related art drive unit.

For example, FIG. 10 illustrates a related art connector in compliance with the above-described Serial ATA (for the drive unit). When the drive unit having the connector illustrated in FIG. 10 is connected to the body 1 to which the embodiment is applied; that is, when the connector illustrated in FIG. 10 of the drive unit is connected to the connector 16 illustrated in FIG. 6, the data transmission and reception between the body 1 and the drive unit 3 may be performed without any interference. Further, whether the drive unit is connected or not connected may be determined based on the device detecting signal.

Figure 11:
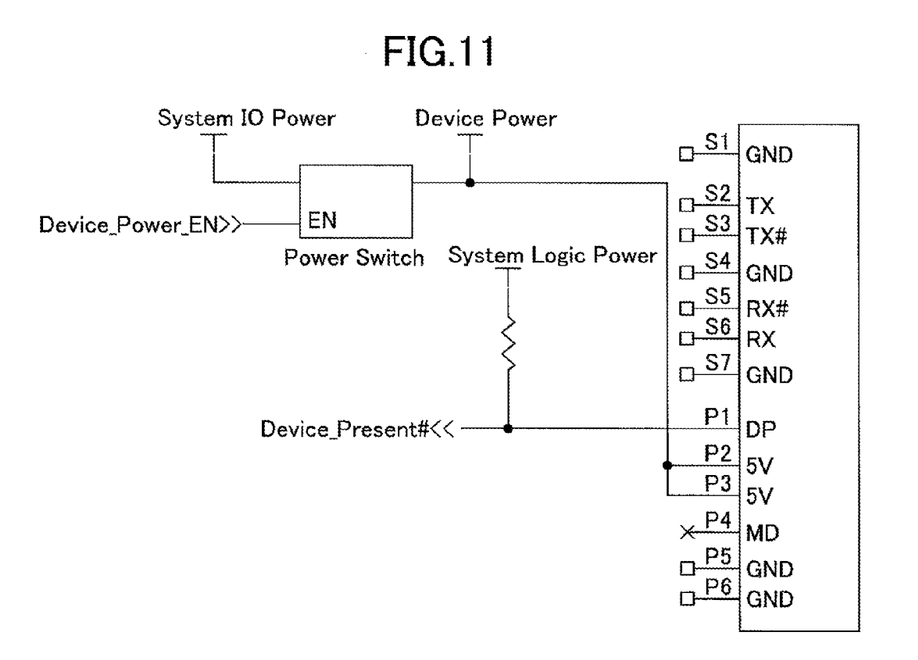
FIG. 11 is a diagram illustrating a configuration in the periphery of a connector connected to the drive unit in a related art personal computer.

FIG. 11 illustrates a related art connector in compliance with the above-described Serial ATA (for the body). When the body of the PC having the connector illustrated in FIG. 11 is connected to the drive unit 3 to which the embodiment is applied; that is, when the connector illustrated in FIG. 11 of the body is connected to the connector 33 illustrated in FIG. 7, the data transmission and reception between the body 1 of the PC 100 and the drive unit 3 may be performed without any interference. Further, whether the drive unit 3 is connected or not connected to the body 1 of the PC 100 may be determined based on the device detecting signal.

According to the disclosed information processing apparatus, the drive unit, the detection circuit, and the control method, the information processing apparatus may be able to resupply the operational power (the operational voltage) without adversely affecting compatibility with the existing drive unit.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
   a connector electrically connected to a drive unit in a state where the drive unit is connected to the information processing apparatus;
   a detector configured to detect an operation performed on a specific button disposed on the drive unit based on a change in a voltage of a specific pin of the connector in a state where the drive unit is connected to the information processing apparatus but is not driving a medium and an operational voltage is not applied to the drive unit;
   a power controller configured to start applying the operational voltage to the drive unit via the connector in response to the operation detected by the detector; and
   a determination unit configured to determine that the drive unit is not connected to the information processing apparatus in a case where the voltage of the specific pin indicates a first voltage value, and determine that the drive unit is connected to the information processing apparatus in a case where the voltage of the specific pin indicates a second voltage value less than the first voltage value, wherein the specific button is an eject button configured to receive an instruction to load or unload the medium from a user, wherein the detector is configured to detect that the eject button of the drive unit, to which the operational voltage is not applied, has been operated in a case where the voltage of the specific pin is changed from the second voltage value to a third voltage value, and wherein the voltage of the specific pin indicates any one of the first, the second, and the third voltage values.

2. The information processing apparatus as claimed in claim 1, wherein
the connector includes an interface in compliance with Serial ATA.

3. The information processing apparatus as claimed in claim 1, wherein
the information processing apparatus is a mobile personal computer, and the drive unit is installed inside a body case of the personal computer.

4. A drive unit comprising:
a connector electrically connected to an information processing apparatus in a state where the drive unit is connected to the information processing apparatus;
an eject button configured to receive an instruction to load or unload a medium from a user;
a signal processor configured to change a voltage of a specific pin of the connector in response to an operation of the eject button in a state where the drive unit is connected to the information processing apparatus but is not driving the medium and an operational voltage is not applied from the information processing apparatus, the voltage of the specific pin of the connector being a signal voltage indicating that the drive unit is connected to the information processing apparatus; and
a booster configured to generate an eject button signal by boosting the voltage of the specific pin in the state where the drive unit is connected to the information processing apparatus but is not driving the medium and the operational voltage is not applied from the information processing apparatus,
wherein the signal processor is configured to lower the voltage of the eject button signal in response to the operation of the eject button to merge the lowered voltage of the eject button signal into the voltage of the specific pin in the state where the drive unit is connected to the information processing apparatus but is not driving the medium and the operational voltage is not applied from the information processing apparatus.

5. The drive unit as claimed in claim 4, wherein
the voltage of the specific pin indicates a first voltage value in a case where the drive unit is not connected to the information processing apparatus, and the voltage of the specific pin indicates a second voltage value less than the first voltage value in a case where the drive unit is connected to the information processing apparatus, and wherein
the signal processor changes the voltage of the specific pin from the second voltage value to a third voltage value less than the second voltage value by merging the lowered voltage of the eject button signal into the voltage of the specific pin.

6. The drive unit as claimed in claim 4, wherein
the drive unit is an optical drive unit.

7. The drive unit as claimed in claim 4, wherein
the connector includes an interface in compliance with Serial ATA.

8. A method for controlling a drive unit connectable to an information processing apparatus, the method comprising:
detecting an operation performed on a specific button disposed on the drive unit based on a change in a voltage of a specific pin of a first connector electrically connected to the drive unit in a state where the drive unit is connected to the information processing apparatus but is not driving a medium and an operational voltage is not applied from the information processing apparatus to the drive unit; and
changing a voltage of a signal of a pin of the first connector, the pin corresponding to a specific pin of a second connector connected to the first connector in response to an operation of an eject button in the state where the drive unit is connected to the information processing apparatus but is not driving the medium and the operational voltage is not applied from the information processing apparatus to the drive unit, the voltage of the signal indicating that the drive unit is connected to the information processing apparatus.

9. The method as claimed in claim 8, further comprising:
starting to apply the operational voltage to the drive unit via respective voltage supply pins of the first and the second connectors in response to the detected operation.

\* \* \* \* \*